United States Patent
Tchoumi et al.

(10) Patent No.: US 12,389,485 B2
(45) Date of Patent: Aug. 12, 2025

(54) PROCESSING OF A CALL BY VIDEOCONFERENCE BETWEEN TWO TERMINALS

(71) Applicant: Orange, Issy-les-Moulineaux (FR)

(72) Inventors: Paul Tchoumi, Chatillon (FR); Yoann Verseillie, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 344 days.

(21) Appl. No.: 17/433,553

(22) PCT Filed: Feb. 10, 2020

(86) PCT No.: PCT/FR2020/050221
§ 371 (c)(1),
(2) Date: Aug. 24, 2021

(87) PCT Pub. No.: WO2020/174144
PCT Pub. Date: Sep. 3, 2020

(65) Prior Publication Data
US 2022/0167454 A1 May 26, 2022

(30) Foreign Application Priority Data

Feb. 25, 2019 (FR) ..................................... 1901897

(51) Int. Cl.
*H04W 24/10* (2009.01)
*H04L 12/26* (2006.01)
(Continued)

(52) U.S. Cl.
CPC ......... *H04W 76/20* (2018.02); *H04L 65/1104* (2022.05); *H04L 65/80* (2013.01); *H04W 72/543* (2023.01)

(58) Field of Classification Search
None
See application file for complete search history.

(56) References Cited

U.S. PATENT DOCUMENTS 7,768,947 B2 * 8/2010 Zimmet ................. H04L 51/23
709/239
9,483,175 B2 * 11/2016 Wagner ............... G06F 3/04886
(Continued)

FOREIGN PATENT DOCUMENTS

EP 2326058 A1 * 5/2011 ........... H04L 65/104
KR 100646228 B1 11/2006
WO WO 2005/120115 A1 12/2005

OTHER PUBLICATIONS

Anonymous, "Orange Mobile World Congress 2019: Virtual Press Room—orange.com", Feb. 22, 2019, Retrieved from the Internet: https://www.orange.com/en/Press-Room/Folder/Orange-Mobile-World-Congress-2019.

(Continued)

*Primary Examiner* — Sithu Ko
(74) *Attorney, Agent, or Firm* — Knobbe, Martens, Olson & Bear, LLP

(57) ABSTRACT

The processing of a call between at least two terminals via a network is disclosed, where a videoconference session between the terminals being in process, and network conditions being likely to degrade the quality of a videoconference call between the terminals. A server then implements the following: upon receipt of a first message from the server about degradation of the videoconference call quality, the first message originating from at least one the terminals and comprising identifiers in the network of the terminals, interrupting the videoconference call, and using the identifiers of the terminals to transmit a second message to the terminals about linking the terminals in the form of an audio call, the second message comprising an instruction to prevent a human-machine interface for notifying of an incoming call from executing.

20 Claims, 2 Drawing Sheets

(51) Int. Cl.
*H04L 65/1104* (2022.01)
*H04L 65/80* (2022.01)
*H04W 72/543* (2023.01)
*H04W 76/20* (2018.01)

(56) References Cited

U.S. PATENT DOCUMENTS

| | | | | |
|---|---|---|---|---|
| 9,503,368 | B2* | 11/2016 | Taylor | H04L 45/306 |
| 2005/0180338 | A1* | 8/2005 | Pirila | H04L 65/80 |
| | | | | 370/465 |
| 2007/0249357 | A1* | 10/2007 | Aveline | H04W 76/20 |
| | | | | 455/445 |
| 2013/0110565 | A1* | 5/2013 | Means, Jr. | G06Q 10/06 |
| | | | | 705/7.11 |
| 2015/0103785 | A1* | 4/2015 | Jung | H04L 65/80 |
| | | | | 370/329 |
| 2017/0085600 | A1* | 3/2017 | Carter | H04L 65/1089 |
| 2017/0171286 | A1* | 6/2017 | Coste | H04L 65/403 |
| 2018/0041913 | A1* | 2/2018 | Zhu | H04L 65/65 |
| 2019/0026212 | A1* | 1/2019 | Verkasalo | H04L 67/535 |

OTHER PUBLICATIONS

"3rd Generation Partnership Project: Technical Specification Group Services and System Aspects: Redial solution for voice-video switching (Release 15)", 3GPP Standard; Technical Report: 3GPP TR 23.903, 3rd Generation Partnership Project (3GPP), Mobile Competence Centre; 650, Route Des Lucioles; F-06921 Sophia-Antipolis Cedexx; France, vol. SA WG2, No. V15.0.0, Jun. 21, 2018, pp. 1-18.

International Search Report for International Application No. PCT/FR2020/050221, mailed on Apr. 2, 2020.

* cited by examiner

PROCESSING OF A CALL BY VIDEOCONFERENCE BETWEEN TWO TERMINALS

CROSS-REFERENCE TO RELATED APPLICATIONS

This application is filed under 35 U.S.C. § 371 as the U.S. National Phase of Application No. PCT/FR2020/050221 entitled "PROCESSING OF A CALL BY VIDEOCONFERENCE BETWEEN TWO TERMINALS" and filed Feb. 10, 2020, and which claims priority to FR 1901897 filed Feb. 25, 2019, each of which is incorporated by reference in its entirety.

BACKGROUND

Field

This development relates to the processing of a call between two terminals via a network.

Description of the Related Technology

More particularly, in the case of an ongoing call by videoconference between two terminals, it is possible for the quality of the call to deteriorate due to current conditions of the network.

Typically, in a cellular network, the quality of the link between two terminals can deteriorate (due to interference or a bad link between a base station of the network and one of the terminals, due to congestion in the network, or other reasons). If the speed via the network decreases too much, a videoconferencing session in progress (for example using the IP protocol) may be interrupted and switch to audio only ("voice over IP" or VOIP). In fact, a decent videoconference quality using the IP protocol is ensured by a speed of around 400 kbps. Below such speeds, it can be degraded to the point of having to switch the call to audio only (VOIP). Below a second speed threshold (typically 40 kbps), VOIP communication can degrade to the point where it completely stops.

One of the users of the two terminals must then call the other party back in order to continue the call in simple GSM-type communication mode (first or second generation—"Edge" mode). This type of GSM communication does indeed support low speeds (typically between a few kbps and 40 kbps).

However, such an approach currently requires one of the users to reenter the telephone number of the other party on his or her terminal. This "telephone number" is more generally an identifier of the other party's terminal in the network (which may for example be an MSISDN type identifier in a cellular network).

The development aims to improve the situation.

SUMMARY OF CERTAIN INVENTIVE ASPECTS

To this end, in a general manner it proposes a method for processing a call between at least two terminals via a network, a videoconference session between the two terminals being in progress, network conditions being likely to degrade the call quality of a videoconference call between the two terminals, the method, implemented by at least one server, comprising the following steps: upon receipt, from the server, of a first message about degradation of the videoconference call quality, the message comprising identifiers in the network of the two terminals, interrupting the videoconference call, And, each terminal comprising a human-machine interface for notifying of an incoming call, using the identifiers in the network of the two terminals to transmit a second message to each terminal about linking the two terminals in the form of an audio call, the message comprising an instruction to prevent each terminal's interface for notifying of an incoming call from executing.

Thus, the audio call can take over for the videoconference call in the event of degradation in the quality of the videoconference call, without requiring any intervention by a user of one of the two terminals.

In one embodiment, the second message is in the form of at least one frame containing, in the frame header, said instruction to prevent the interface for notifying of an incoming call from executing.

This simple instruction added to the frame header thus makes it possible to implement the switch from videoconference session to audio call without a specific change to the actual content of the frame ("payload") or its current format.

For example, the videoconference session can use the IP protocol, and the aforementioned frame can be a SIP ("session initiation protocol") frame and simply its header can be modified to add the aforementioned instruction.

Furthermore, in an embodiment where the aforementioned network is a cellular network, the audio call can be established by a GSM-type communication (first or second generation—in "edge" mode), in the event of low speeds forcing an interruption of the videoconference session.

Additionally, in one embodiment, at least one of the terminals (or both) is configured for: repeatedly measuring a videoconference call quality between the two terminals, and transmitting to the server a measurement of the videoconference call quality in the form of said first message, and, in addition, upon receipt of the second message, reading and interpreting this second message in order to receive the audio call without executing the interface for notifying of an incoming call.

In one possible embodiment, prior to establishment of the videoconference session, the calling terminal among the two terminals: measures an expected videoconference call quality between the two terminals, and executes a human-machine interface on the calling terminal to indicate to a user an estimate of the expected videoconference call quality, before initiating the call.

Such an embodiment allows the user of the calling terminal to decide whether to initiate the call even so (audio and not video) or to wait for better network conditions to initiate the videoconference session later on.

In addition, the measurement of this expected quality can be transmitted to the server in order to directly trigger an audio call (rather than video), as presented in an exemplary embodiment detailed below with reference to FIG. 2 (step S4).

In one embodiment, reversibly, in the event that an audio call session is in progress between the two terminals, and if network conditions have improved to allow a videoconference call between the two terminals, the method may also include the following steps, implemented by the server: upon receipt, from the server, of a third message of improved network conditions, the third message comprising identifiers in the network of the two terminals, interrupting the audio call in progress, using the identifiers in the network of the two terminals to transmit a fourth message to each terminal about linking the two terminals in the form of a videoconference call, the fourth message comprising an instruction to prevent each terminal's interface for notifying of an incoming call from executing.

The videoconference call thus takes over for the audio call in the event of improvement in the network conditions, without requiring intervention by a user of one of the two terminals.

The development also relates to a system for processing a call between at least two terminals via a network, a videoconference session between the two terminals being in progress, network conditions being likely to degrade the call quality of a videoconference call between the two terminals, wherein at least one server of the system is configured for: upon receipt, from the server, of a first message about degradation of the videoconference call quality, the message comprising identifiers in the network of the two terminals, interrupting the videoconference call, and, each terminal comprising a human-machine interface for notifying of an incoming call, using the identifiers in the network of the two terminals to transmit a second message to each terminal about linking the two terminals in the form of an audio call, the message comprising an instruction to prevent each terminal's interface for notifying of an incoming call from executing.

The development also relates to a server of a system within the meaning of the development, configured for: upon receipt, from the server, of a first message about degradation of the videoconference call quality, the message comprising identifiers in the network of the two terminals, interrupting the videoconference call, and, each terminal comprising a human-machine interface for notifying of an incoming call, using the identifiers in the network of the two terminals to transmit a second message to each terminal about linking the two terminals in the form of an audio call, the message comprising an instruction to prevent each terminal's interface for notifying of an incoming call from executing.

Typically, this server can comprise a first processing circuit (comprising for example a memory for storing instructions of a computer program for implementing the method, a processor for executing these instructions, one or more interfaces for communication via the aforementioned network) for the implementation of these steps.

The development also relates to a terminal of a system according to the development, specially configured for: repeatedly measuring a videoconference call quality between the two terminals, and transmitting to the server a measurement of the videoconference call quality, in the form of said first message, and, upon receipt of the second message, reading and interpreting the second message in order to receive the audio call without executing the human-machine interface.

Here again, this terminal may comprise a second processing circuit (comprising for example a memory for storing instructions of a computer program, a processor for executing these instructions, an interface for communication via the aforementioned network) for the implementation of these steps.

The development also relates to a computer program comprising instructions for implementing the method according to the development, when these instructions are executed by a processor of a processing circuit.

These instructions may be distributed between the aforementioned server and at least one of the terminals. They may be lastingly stored in a non-transitory storage medium (of the server and/or of the terminal).

An example of a general algorithm of such a program is illustrated in FIG. 2, commented below.

BRIEF DESCRIPTION OF THE DRAWINGS

Other features and advantages of the development are presented in the following detailed description of some exemplary embodiments of the development, as well as in the accompanying drawings in which.

DETAILED DESCRIPTION OF CERTAIN ILLUSTRATIVE EMBODIMENTS

Figure 1:
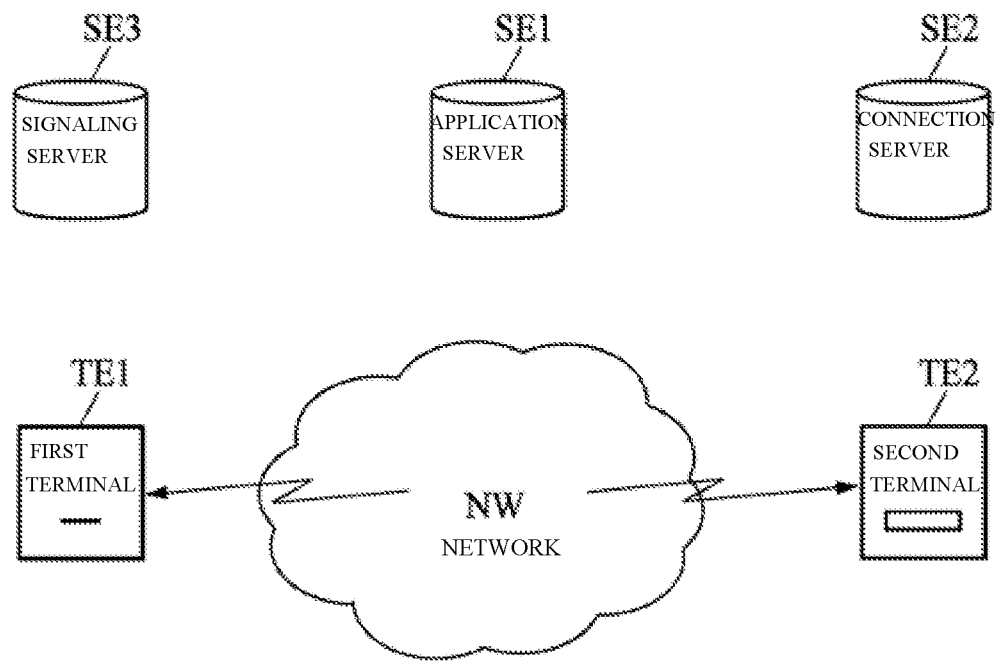
FIG. 1 illustrates an example of a system for implementing the development.

Referring to FIG. 1, a system for implementing the development comprises, according to one exemplary embodiment:

at least a first terminal TE1 and a second terminal TE2, which are able to communicate via a network NW, a first videoconference call synchronization application server SE1 (a "video chat sync" type server for example), a second server SE2 for establishing a connection between at least two terminals, for example of the type used by a call platform and capable of contacting both a "called" telephone and a "calling" telephone of the platform, in order to connect them, and, in the example shown, a third signaling server SE3, for example WebRTC, for implementing the processing in particular of voice over IP and of the videoconferencing session for example using the IP protocol.

Of course, a single server or only two servers can functionally implement the operations which are described below.

Similarly, the system may comprise more than three servers. For example, a link quality test server (for example for the "Calireso"™ application) can be implemented to measure the quality of the link over the network NW between the two terminals and, for example, to transmit this measurement to one of the terminals TE1, TE2 in order to present it to a user of that terminal, via a human-machine interface of the terminal, as will be seen in an exemplary embodiment below.

Typically, implementation of the Calireso application consists of collecting link quality data for the purposes of statistical forecasting at a current time.

In addition to or alternatively to such a statistical estimation of the link quality, dynamic applications for testing speeds in the network NW can be implemented by each terminal TE1, TE2. Here again, a server, for example a "LifBe" application server, can be implemented.

For clarity, the communication quality evaluation servers are not shown in FIG. 1.

Furthermore, the terminals TE1, TE2 may for example be mobile terminals in a cellular network NW. The quality of a communication may thus depend on the status of the network (congestion or other status), the reception of the network for each terminal, etc.

Figure 2:
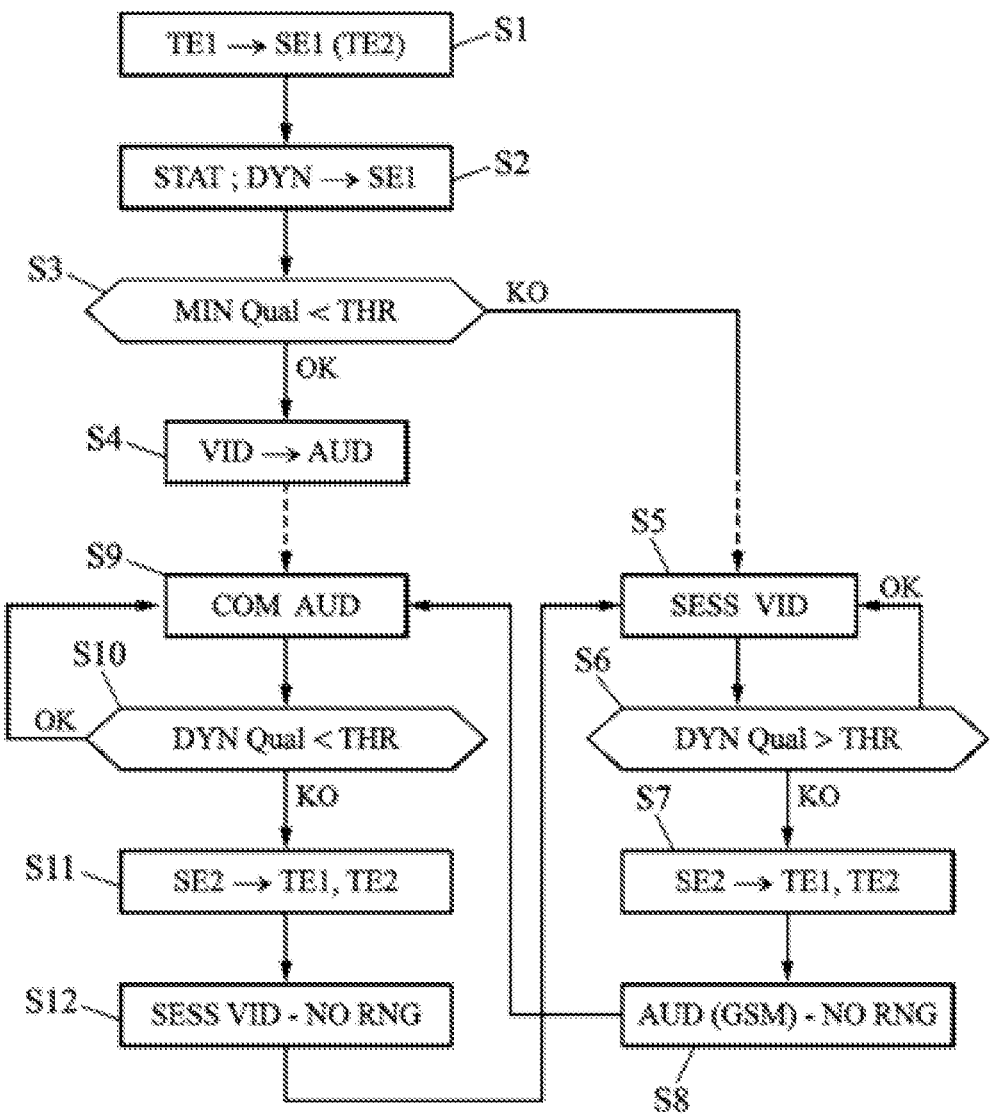
FIG. 2 illustrates an example of a succession of steps that can constitute a method within the meaning of the development.

Referring now to FIG. 2, a first step may consist, for example, of the calling terminal TE1 transmitting videoconference call forecast information to the application server SE1 for a call with the terminal called TE2. This transmission of information can typically be implemented by executing a software application on terminal TE1, in order to transmit to the application server SE1 in particular the "numbers" of the terminals TE1 and TE2, corresponding to their identifier in the network NW (for example their ISDN identifier or their MSISDN identifier for mobile terminals in a cellular network).

Moreover, in step S2, the application server SE1 may receive from the terminal TE1 one or more statistical STAT and/or dynamic DYN evaluation(s) (respectively via the Calireso and Liffie applications for example) of the quality of the link with the network. Optionally, the server SE1 may also receive from the second terminal TE2 one or more measurements of its link quality.

In the next step S3, the server SE1 can then assess the quality of the upcoming communication between the two terminals TE1, TE2, for example by retaining the minimum between:
- the dynamic evaluation of the instantaneous network reception quality by the first terminal TE1,
- the dynamic evaluation of the instantaneous network reception quality by the second terminal TE2, and
- the statistical evaluation of the usual link quality, for the same parameters (time of day, current network congestion, for locations respectively corresponding to those of terminals TE1 and TE2, etc.), these being data that can typically be provided by the aforementioned Calireso™ application.

For example, in step S3, the server SE1 can compare the minimum MIN among these evaluations, with a threshold THR, to determine whether the speed of the network corresponding to this minimum MIN is insufficient to establish a videoconference session (for example below 400 kbps). If such is the case (OK arrow exiting test S3 in FIG. 2), then the call to be established is of the audio type (in voice over IP or directly by GSM call if the MIN evaluation is also below a threshold for example of 40 kbps). In this case, a human-machine interface of the calling terminal TE1 can be executed in order to notify its user that the call to be established must be audio.

Such an implementation is advantageous as such (even before the actual establishment of the call) and may possibly be the object of separate protection.

In the case where the link is of sufficient quality for a videoconference session (KO arrow exiting test S3), the videoconference session can be established in step S5.

Then, in step S6, the link quality is tested repeatedly (for example cyclically every 30 seconds), using the aforementioned applications Calireso and/or Liffie, or even using an application internal to the terminal (without requiring a particular server), for example the "getStat ( )" application for evaluating the quality of reception at a given terminal.

If one of the terminals, during the video session, dynamically observes that the quality is below a threshold THR in step S6 (arrow KO exiting test S6), this terminal sends to the application server SE1 in step S7, the aforementioned "first message" about degradation of the videoconference call quality, this message comprising identifiers (ISDN or MSISDN) in the network NW of the two terminals TE1 and TE2. The application server SE1 transmits these identifiers, in the aforementioned "second message", to the connection server SE2 so that the latter contacts the two terminals TE1 and TE2 in order to connect them. In particular, server SE2 addresses a SIP frame to each of the two terminals TE1 and TE2 and the header of this frame controls each terminal's interface for notifying of an incoming call so that it is not executed (for example so that the terminal does not ring because of the incoming call). The video session can then be interrupted, and in step S8 the audio call (typically by GSM) can be initiated without causing the phones to "ring".

Of course, the application server SE1 and the connection server SE2 can constitute the same server. The server SE3 for the WebRTC application can also be an integral part.

Referring again to FIG. 2, reversibly, in step S9, audio communication can be established, and nevertheless, repeatedly in step S10, as long as the quality of the link has not exceeded the threshold THR (arrow OK exiting test S10), the communication remains audio. Otherwise (arrow KO exiting test S10), the quality of the link becomes sufficient to return the call to a videoconference session and for this purpose, one of the terminals transmits to server SE2 the "third message" comprising the call identifiers of each terminal in order to establish a connection between them (step S11) and thus switch the call to a videoconference session using the IP protocol, and do so without causing the terminals to ring, by the use of a SIP frame comprising such an instruction and transmitted from server SE2 to the terminals TE1 and TE2 in step S12.

Typically, the instruction in the SIP frame header can be of the following type in CCXML (for "Call Control eXtensible Markup Language"):
    <createcall . . . hint="X-noRinging=1"/>

The connection request that server SE1 sends to server SE2 may, for example, be an http request of the type:

```
curl -k -v -X POST -H "Authorization: Bearer xxx" -H
"Content-Type:
application/json" -d '{" maxCallDuration":
360,"firstCalledParticipant":
{"uri": "tel:+3361...", "ringingTimeout": "60"},
"secondCalledParticipant": {
"uni": "tel:+3362....", "ringingTimeout": "60" }}'
https://SERV.SE2 /...
api/callSessions/createTwoParticipantsCallNoRinging
```

Here, "+3361 . . . " and ": +3362 . . . " represent the respective MSISDN identifiers of the first and second terminals TE1 and TE2.

Of course, the development is not limited to the embodiments presented above as examples.

These embodiments are typically subject to evolve as the conventionally applied protocols (IP or others) evolve.

In addition, the development can be applied to two terminals or to more than two terminals. It is in fact possible to connect more than two terminals, typically in steps S11 and S7.

The invention claimed is:

1. A method of processing a call between at least two terminals via a network, a videoconference session between the at least two terminals being in progress, each of the at least two terminals having a human-machine interface for notifying of incoming calls, the method, implemented by at least one server, comprising:
   upon receipt, from the server, of a first message of degradation of the videoconference call quality, the first message originating from at least one of the at least two terminals and comprising identifiers in the network of the terminals, interrupting the videoconference call, and
   using the identifiers of the at least two terminals to transmit a second message to the at least two terminals, of linking the at least two terminals via an audio call, the second message comprising an instruction to prevent the human-machine interfaces of the at least two terminals from executing for notifying of the audio call while permitting reception of the audio call, the audio call taking over for the videoconference call without requiring intervention by a user of at least one of the two terminals.

2. The method of claim 1, wherein the second message comprises at least one frame containing, in the frame header, the instruction to prevent the interface for notifying of incoming calls from executing.

3. The method of claim 2, wherein the frame is a Session Initiation Protocol (SIP) frame.

4. The method of claim 1, wherein the videoconference session uses an Internet Protocol (IP).

5. The method of claim 1, wherein the network is a cellular network, and the audio call is established by Global System for Mobile (GSM) communication.

6. The method of claim 1, an audio call session being in progress between the at least two terminals, and network conditions having improved to allow a videoconference call between the at least two terminals, the method further comprising:

upon receipt of a third message of improved network conditions, the third message comprising identifiers in the network of the at least two terminals, interrupting the audio call in progress, using the identifiers in the network of the at least two terminals to transmit a fourth message to the at least two terminals, of linking the at least two terminals via a videoconference call, the fourth message comprising an instruction to prevent the human-machine interface for notifying of incoming calls from executing.

7. A method implemented by at least a first terminal of a communication network, the method being implemented during a videoconference session between the first terminal and at least a second terminal, the first terminal having a human-machine interface for notifying of incoming calls, the method comprising:

transmitting to a server a measurement of the videoconference call quality via a first message, the first message comprising identifiers in the network of the first and second terminals, and, upon receipt of a second message of linking the first and second terminals via an audio call, reading and interpreting the second message in order to permit reception of the audio call without executing the human-machine interface for notifying of incoming audio calls, the audio call taking over for the videoconference call without requiring intervention by a user of at least one of the two terminals.

8. The method of claim 7, wherein, the first terminal initiating the videoconference call, the method comprises, prior to establishing the videoconference session:

executing a human-machine interface on the first terminal to indicate an estimate of an expected quality of a videoconference call between the first and second terminals, before initiating the videoconference call.

9. The method according to claim 7, wherein the network is a cellular network, and the audio call is established by Global System for Mobile (GSM) communication.

10. A server for processing a call between at least two terminals via a network, the call being a videoconference session in progress between the at least two terminals, each of the at least two terminals having a human-machine interface for notifying of incoming calls, the server comprising at least one processor configured for:

upon receipt of a first message of degradation of the videoconference call quality, the first message originating from at least one of the at least two terminals and comprising identifiers in the network of the at least two terminals, interrupting the videoconference call, and using the identifiers in the network of the at least two terminals to transmit a second message to the at least two terminals, of linking the at least two terminals via an audio call, the second message comprising an instruction to prevent the human-machine interfaces of the at least two terminals from executing for notifying of the audio call while permitting reception of the audio call, the audio call taking over for the videoconference call without requiring intervention by a user of at least one of the two terminals.

11. The server according to claim 10, wherein the second message comprises at least one frame containing, in the frame header, the instruction to prevent the interface for notifying of incoming calls from executing.

12. The server according to claim 11, wherein the frame is a SIP frame.

13. The server according to claim 10, wherein the videoconference session uses an Internet Protocol (IP).

14. The server according to claim 10, wherein the network is a cellular network, and the audio call is established by GSM communication.

15. The server according to claim 10, wherein the at least one processor is configured for:

upon receipt, while an audio call session is in progress between the at least two terminals, of a third message of improved network conditions, the third message comprising identifiers in the network of the at least two terminals and the network conditions having improved to allow a videoconference call between the at least two terminals, interrupting the audio call in progress; and using the identifiers in the network of the at least two terminals to transmit to the at least two terminals a fourth message of linking the at least two terminals via a videoconference call, the fourth message comprising an instruction preventing the human-machine interfaces for notifying of incoming calls from executing.

16. A first terminal of a communication network, comprising at least one processor configured to execute the method of claim 7.

17. The first terminal of a communication network according to claim 16, wherein, the first terminal initiating the videoconference call, the at least one processor is configured to execute a human-machine interface on the first terminal, prior to establishing the videoconference session, in order to indicate an estimate of an expected quality of a videoconference call between the first and second terminals, before initiating the videoconference call.

18. A processing circuit comprising a processor and a memory, the memory storing code instructions of a computer program comprising instructions to implement, when the instructions are executed by the processor of the processing circuit, a method for processing a call between at least two terminals via a network, a videoconference session between the at least two terminals being in progress, each of the at least two terminals comprising a human-machine interface for notifying of incoming calls, the method, implemented by at least one server, comprising:

upon receipt, from the server, of a first message of degradation of the videoconference call quality, the first message originating from at least one of the at least two terminals and comprising identifiers in the network of the at least two terminals, interrupting the videoconference call, and using the identifiers of the at least two terminals to transmit a second message to the at least two terminals, of linking the at least two terminals via an audio call, the second message comprising an instruction to prevent the human-machine interfaces of the at least two terminals from executing for notifying of the audio call while permitting reception of the audio call, the audio call taking over for the videoconference call without requiring intervention by a user of at least one of the two terminals.

19. A system comprising a server for processing a call between at least two terminals via a network, the call being a videoconference session in progress between the at least two terminals, each of the at least two terminals comprising a human-machine interface for notifying of incoming calls, the server comprising at least one processor configured for:

upon receipt of a first message of degradation of the videoconference call quality, the first message originating from at least one of the at least two terminals and comprising identifiers in the network of the at least two terminals, interrupting the videoconference call, and using the identifiers in the network of the at least two terminals to transmit a second message to the at least two terminals, of linking the at least two terminals via an audio call, the second message comprising an instruction to prevent the human-machine interfaces of the at least two terminals from executing for notifying of the audio call while permitting reception of the audio call, and at least a first terminal among the at least two terminals, the first terminal comprising at least one processor configured to execute a method being implemented during a videoconference session between the first terminal and at least a second terminal of the communication network, the processor being further configured to:

transmit to the server a measurement of the videoconference call quality via the first message, the first message comprising identifiers in the network of the first and second terminals, and upon receipt of the second message of linking the first and second terminals via an audio call, read and interpret the second message in order to receive the audio call without executing the human-machine interface for notifying of incoming calls, the audio call taking over for the videoconference call without requiring intervention by a user of at least one of the two terminals.

20. A processing circuit comprising a processor and a memory, the memory storing code instructions of a computer program comprising instructions to implement, when the instructions are executed by the processor of the processing circuit, a method executed by a first terminal of a communication network, the method being implemented during a videoconference session between the first terminal and at least a second terminal, the first terminal comprising a human-machine interface for notifying of incoming calls, the method comprising:

transmitting to a server a measurement of the videoconference call quality via a first message, the first message comprising identifiers in the network of the first and second terminals, and upon receipt of a second message of linking the first and second terminals via an audio call, reading and interpreting the second message in order to permit reception of the audio call without executing the human-machine interface for notifying of incoming calls, the audio call taking over for the videoconference call without requiring intervention by a user of at least one of the two terminals.

* * * * *